US012444326B2

(12) United States Patent
Schwarz et al.

(10) Patent No.: US 12,444,326 B2
(45) Date of Patent: Oct. 14, 2025

(54) SHELF IMAGING DEVICE FOR A SHELF SUPPORT AND SHELF SYSTEM COMPRISING THE SHELF IMAGING DEVICE

(71) Applicant: Captana GmbH, Ettenheim (DE)

(72) Inventors: Thomas Schwarz, Hohberg (DE); Michael Unmüßig, Ettenheim (DE)

(73) Assignee: Captana GmbH (DE)

( * ) Notice: Subject to any disclaimer, the term of this patent is extended or adjusted under 35 U.S.C. 154(b) by 185 days.

(21) Appl. No.: 18/289,662

(22) PCT Filed: May 6, 2022

(86) PCT No.: PCT/EP2022/062259

§ 371 (c)(1),
(2) Date: Nov. 6, 2023

(87) PCT Pub. No.: WO2022/234072

PCT Pub. Date: Nov. 10, 2022

(65) Prior Publication Data

US 2024/0242639 A1 Jul. 18, 2024

(30) Foreign Application Priority Data

May 7, 2021 (FR) ....................................... 2104841

(51) Int. Cl.
*G09F 3/20* (2006.01)

(52) U.S. Cl.
CPC .............. *G09F 3/208* (2013.01); *G09F 3/204* (2013.01)

(58) Field of Classification Search
CPC ........... G09F 3/208; G09F 3/204; G09F 3/202
See application file for complete search history.

(56) References Cited

U.S. PATENT DOCUMENTS 6,418,651 B1 * 7/2002 Joliey ..................... G09F 3/204 40/621
2003/0111580 A1 * 6/2003 Catteau .................. G09F 3/204 248/222.51

(Continued)

FOREIGN PATENT DOCUMENTS

FR 2765019 B1 10/1999
FR 3099020 A1 1/2021

(Continued)

OTHER PUBLICATIONS

International Search Report for PCT/EP2022/062259 mailed Sep. 2, 2022. 4 pages.

(Continued)

*Primary Examiner* — Gary C Hoge
(74) *Attorney, Agent, or Firm* — Lerner David LLP

(57) ABSTRACT

The invention relates to a shelf imaging device for a shelf support, wherein the shelf support is installed on a shelf edge and comprises a receiving section configured to receive electronic shelf labels on the shelf support. The shelf imaging device comprises a back side (302) configured to be removably fitted in the receiving section, a front side (301) opposite to the back side (302), an optical sensor (305) configured to acquire an image of shelves facing the front side (301), an engaging member for engaging the receiving section so as to lock the shelf imaging device into the shelf support, when the engaging member protrudes from the shelf imaging device, at or behind the back side (302) of the shelf imaging device and an actuator (503).

7 Claims, 6 Drawing Sheets

(56) References Cited

U.S. PATENT DOCUMENTS

| | | | | |
|---|---|---|---|---|
| 2010/0088937 | A1* | 4/2010 | Lee | G09F 3/20<br>40/642.02 |
| 2013/0286564 | A1* | 10/2013 | Suzuki | G09F 3/208<br>361/679.01 |
| 2017/0278057 | A1 | 9/2017 | Itou et al. | |
| 2018/0268745 | A1* | 9/2018 | de Haas | H01R 25/145 |
| 2019/0080633 | A1* | 3/2019 | Bottine | G06F 3/147 |
| 2021/0090471 | A1* | 3/2021 | Kim | G09F 3/208 |
| 2022/0360695 | A1* | 11/2022 | Schwarz | H04N 23/57 |
| 2023/0410694 | A1* | 12/2023 | Rossl | G09F 3/204 |
| 2024/0185744 | A1* | 6/2024 | Rössl | G09F 3/208 |
| 2024/0242176 | A1* | 7/2024 | Schwarz | G06Q 10/087 |
| 2024/0355235 | A1* | 10/2024 | Zheng | A47F 5/0068 |
| 2024/0363033 | A1* | 10/2024 | Rössl | G09F 3/208 |

FOREIGN PATENT DOCUMENTS

| | | | |
|---|---|---|---|
| WO | 9858360 | A1 | 12/1998 |
| WO | 2019057716 | A1 | 3/2019 |

OTHER PUBLICATIONS

French Preliminary Search Report for FR 2104841 dated Dec. 10, 2021. 3 pages. [See p. 1, categorizing the cited references].

* cited by examiner

SHELF IMAGING DEVICE FOR A SHELF SUPPORT AND SHELF SYSTEM COMPRISING THE SHELF IMAGING DEVICE

CROSS-REFERENCE TO RELATED APPLICATIONS

The present application is a national phase entry under 35 U.S.C § 371 of International Application No. PCT/EP2022/062259 filed May 6, 2022, which claims priority from French Application No. 2104841 filed May 7, 2021, all of which are hereby incorporated herein by reference.

TECHNICAL FIELD

The present invention generally pertains to the field of electronic imaging devices for shelves, in particular imaging devices for acquiring images of shelves areas where articles are stored.

PRIOR ART

Such shelves areas can be part e.g. of a warehouse, or of a sales area. Articles are placed in the shelves areas, and labels can also be placed in the shelves areas for displaying information associated with the articles.

The imaging devices may be used in particular for visualizing the layout of electronic labels and articles in the shelves. In such use, one or more images of an area of the shelves, where the electronic labels and the articles are located, are acquired by the imaging device. This area is referred to as a "viewing area" of the imaging device, and it is associated to the imaging device (it is typically positioned in front of the imaging device). After being acquired the images are sent to processing means, to be analyzed and exploited for various purposes.

More precisely, the invention is directed to an imaging device adapted to be mounted on a row of a shelf, and to a shelf system comprising such imaging device. Imaging devices adapted to be mounted on a row of a shelf will herein be referred to as "shelf imaging devices", and the invention therefore is directed to a shelf imaging device, and to a shelf system comprising such shelf imaging device.

Shelves of a salespoint are generally organized in gondolas or shelf rows. Each gondola comprises several rows, and each row comprises several shelf labels situated in the vicinity of articles which are placed on the rows. Each shelf label is typically associated with one type of article (the type of article may be referred as a "SKU"), and the shelf label displays information about this type of article. The shelf labels are disposed along the front edge of the shelves and thus display information related to articles offered for sale, such as price, price per weight, name of the article, etc.

In order to allow easy and fast article information updates and to decrease operational costs, the use of electronic shelf labels (referred to below as "ESLs") in shelves is widely known. The article information displayed on the screen of one ESL is remotely controlled through radiofrequency signals, be it low frequency, high frequency or ultra-high frequency.

As stated above, shelf imaging devices can be used to acquire one or more images of a viewing area.

The shelf imaging device is typically a camera, or another type of device able to acquire images of the viewing area.

FIG. 1 represents the shelf 3, of a gondola intended to be arranged in a sales area. The shelf 3 comprises a shelf support 20. The shelf support 20 is, for example, a rail and comprises a receiving section 21 adapted to house the ESLs 4 and the shelf imaging devices 1. Thus, the ESLs 4 and the shelf imaging device 1 are placed onto the same shelf support 20 (here: the shelf support is a rail).

The shelf support 20 is installed on one of the edges of the shelf 3. The shelf imaging device 1 is mounted on the shelf support 20, and locked in a fixed position on the receiving section 21, with a locking mechanism. Such mechanism typically is, or includes, an engaging member such as a pin, for engaging a holding part of the receiving section 21.

The holding part of the receiving section 21 can be, any holding part able to receive the engaging member for maintaining it in a locked, fixed position. The holding part of the receiving section can be for example, discrete holes that can cooperate with a pin from the shelf imaging device 1 serving as an engaging member, for locking the shelf imaging device in the receiving section 21 of the shelf support 20. FIG. 2 represents the shelf imaging device 1 with the engaging member 502. This engaging member 502 is movable between a retracted position and an extended position.

In the retracted position, the engaging member 502 is at least partly fitted inside the casing and imaging device 1 is in a free position, detachable from the receiving section 21.

In the extended position the engaging member 502 is in a locking position. In the configuration of FIG. 2 the engaging member 502 is fitted into a corresponding part of the receiving section 21, so as to lock the shelf imaging device into the receiving section.

The same receiving section 21 also serves to receive ESLs 4, thus mounted on the same shelf 3 (and the same receiving section 21) as the shelf imaging device 1. These ESLs 4 can be mounted on the receiving section 21 near, or even adjacent to, the shelf imaging device 1.

It can be desired to change the location of the shelf imaging device 1 (e.g. for placing it in front of another viewing area, or for repairing it or for otherwise ensuring its maintenance). Therefore, the locking mechanism should allow unlocking the shelf imaging device from the shelf support 20 for detaching the shelf imaging device 1 from the shelf 3, and relocking the shelf imaging device 1 on the same shelf 3, or onto another shelf 3. Thus, the locking means of the shelf imaging device should allow a removable locking of the shelf imaging device on the shelf support (more precisely: in the receiving section 21 of the shelf support).

To allow such removable locking, it is already known to use a shelf imaging device 1 having locking means, which can be actuated (for locking or unlocking the shelf imaging device on a row), through an actuator (i.e. actuating means) of the shelf imaging device 1. Such actuator actuates the locking means, to position the locking means either in a locking position where the shelf imaging device 1 can be locked on the receiving section 21, or in a free position where the shelf imaging device is free to be displaced relative to the shelf 3, and to be detached from the shelf 3.

In many known shelf imaging devices 1, the actuator is physically accessible to the user, and protrudes from the casing of the imaging device 1 so that the user can manually activate the actuator (e.g. by pushing or pulling it with his/her hand or finger, or with a hand tool). Such protruding actuator can be e.g. a pin protruding from the casing of the imaging device. This is the case in FIG. 2 wherein the engaging member 502 acts as an actuator, and can be directly activated (pushed or pulled) by the hand of a user.

A drawback associated with such known shelf imaging devices 1 is that the user has to physically access the actuator and, when the imaging device is positioned adjacent to an ESL 4, the user may have to displace the adjacent ESL 4 before being able to physically access the actuator of the shelf imaging devices, and to trigger actuation of the locking means.

Another drawback associated with such known shelf imaging devices is that the protruding actuator is a mechanical element can be damaged or broken, because of a rough manipulation or because of shocks with external elements.

It is also to be noted that shelf imaging devices, which are being mounted on the same shelf support 20 as ESLs 4, are significantly thicker than ESLs 4. This is because the internal elements of the shelf imaging devices include a battery, connectors, and other elements. Thus, as illustrated on FIG. 1, since the back faces of shelf imaging devices 1 and ESLs 4 are aligned against shelf support 20 when shelf imaging devices and ESLs 4 are mounted on the same shelf 3, the front faces of shelf imaging devices 1 extend further in the front than the front faces of the ESLs 4. The thickness of shelf imaging devices 1 is typically more than 1.5 cm, while the thickness of an ESL 4 is approximately 10 mm.

It is also known to provide an ESL 4 with a specific locking mechanism that can be activated using a magnetic extraction tool. This mechanism and extraction tool are, for example, described in the French patent reference FR2765019B1. However, because of the thickness of the shelf imaging device 1, the implementation of the locking mechanism described in the French patent reference FR2765019B1 in the shelf imaging devices 1 would need a magnetic extraction tool generating a residual magnetism of more than 1.4 Tesla. This amount of residual magnetism could generate drawbacks, such as disruptions on the shelf imaging devices 1 or undesired activation of medical devices, such as pacemakers, worn by the user.

The invention aims at solving the drawbacks mentioned above, taking also into account that the shelf imaging device is mounted on the same shelf 3 as ESLs 4, and taking also into account the significant thickness (i.e. more than 2 cm) of shelf imaging devices 1, compared to the lesser thickness of ESLs 4.

GENERAL PRESENTATION OF THE INVENTION

An object of the invention is a shelf imaging device for a shelf support, wherein the shelf support is installed on a shelf edge and comprises a receiving section configured to receive electronic shelf labels on the shelf support, the receiving section comprising two facing wings extending in a longitudinal direction, one of the two wings has in its medial region a longitudinal groove, the groove has a plurality of holes.

The shelf imaging device comprises:

- a back side configured to be removably fitted in the receiving section,
- a front side opposite to the back side,
- an optical sensor configured to acquire an image of shelves facing the front side,
- an engaging member for engaging the receiving section so as to lock the shelf imaging device into the shelf support, when the engaging member protrudes from the shelf imaging device and engages one of the holes, at or behind the back side of the shelf imaging device,
- a guiding element and a spring, the guiding element and the spring being configured together to urge upwardly the engaging member to project through an opening of the shelf imaging device,
- an actuator configured to move the engaging member between a locking position where the shelf imaging device is locked into the shelf support and a free position where the shelf imaging device is free to be displaced relative to the shelf support, the actuator comprising a magnetic element which extends between a front end located near the front side and/or near a lateral side of the shelf imaging device, and a back end linked to the engaging member, and
- a link linking together the guiding element, the engaging member and the actuator.

In the present patent application, "near the front side" means that the distance between the front end of the actuator and the front side is between 1 mm and 2 mm, advantageously 1.5 mm.

In the present patent application, "near the lateral side" means that the distance between the front end of the actuator and the lateral side is between 1 mm and 2 mm, advantageously 1.5 mm.

Because the front end is near the front side of the shelf imaging device, it allows the use of a magnetic extraction tool having a magnet with a residual magnetism of less than 1.4 Tesla and advantageously comprised between 1.29 Tesla and 1.32 Tesla.

Therefore, the magnetic extraction tool used to unlock the shelf imaging device will reduce the disruptions on the shelf imaging device and will reduce the risk of undesirable activations of medical devices, such as pacemakers, worn by the user.

Furthermore, because of its residual magnetism limited to only 1.4 Tesla, the same magnetic extraction tool used to unlock the ESL can also be used with the shelf imaging device of the invention.

The above-defined device can comprise the following advantageous and non-limiting features, taken alone or in any technically feasible combination:

- the magnetic element of the actuator is a metal plate extending along a plane perpendicular to the front side, parallel to the lateral side and near the lateral side, a length of the metal plate is comprised between 2 cm and 3 cm, preferably 2.5 cm and/or a width of the metal plate is comprised between 0.5 cm and 1.5 cm, preferably 0.9 cm and/or a thickness of the metal plate is comprised between 0.8 mm and 1.2 mm, preferably 1 mm.
- the front end is located between 1 mm and 2 mm, preferably 1.5 mm, of the front side of the shelf imaging device.
- the front end is located between 1 mm and 2 mm, preferably 1.5 mm, of a lateral side of the shelf imaging device.
- a distance between the engaging member and the front side of the shelf imaging device is comprised between 1 cm and 2 cm, preferably 1.5 cm.
- the guiding element, the engaging member and the actuator form a single piece.

Another object of the invention is a shelf system comprising a shelf, preferably for a gondola of a sales area. The shelf comprises a shelf support configured to extend along an edge of the shelf, the shelf support comprising a receiving section configured to receive electronic labels on the shelf support and an imaging device, the back side of the imaging device being configured to be removably fitted in the receiving section of the shelf support.

Within the shelf system, the receiving section comprises two facing wings extending in a longitudinal direction, one of the two wings has in its medial region a longitudinal groove the groove has a plurality of holes and the engaging member is configured for engaging one of the holes.

GENERAL PRESENTATION OF THE DRAWINGS

Other characteristics, objectives and advantages of the invention are set forth in the following detailed description, which is solely illustrative and non-limiting, and is to be read in conjunction with the following annexed drawings which represent, in addition to FIGS. 1 and 2 already commented above:

DETAILED DESCRIPTION OF EMBODIMENTS OF THE INVENTION

As mentioned above, FIG. 1 represents the shelf 3, of a gondola intended to be arranged in a sales area. The shelf 3 comprises a shelf support 20. The shelf support 20 is for example a rail and comprises a receiving section 21 adapted to house the ESLs 4 and the shelf imaging devices 1. The shelf support 20 is installed on one of the edges of the shelf 3. In this example the shelf support 20 is a rail having a hollow section into which ESLs and the shelf imaging device can be engaged and locked.

Figure 1:
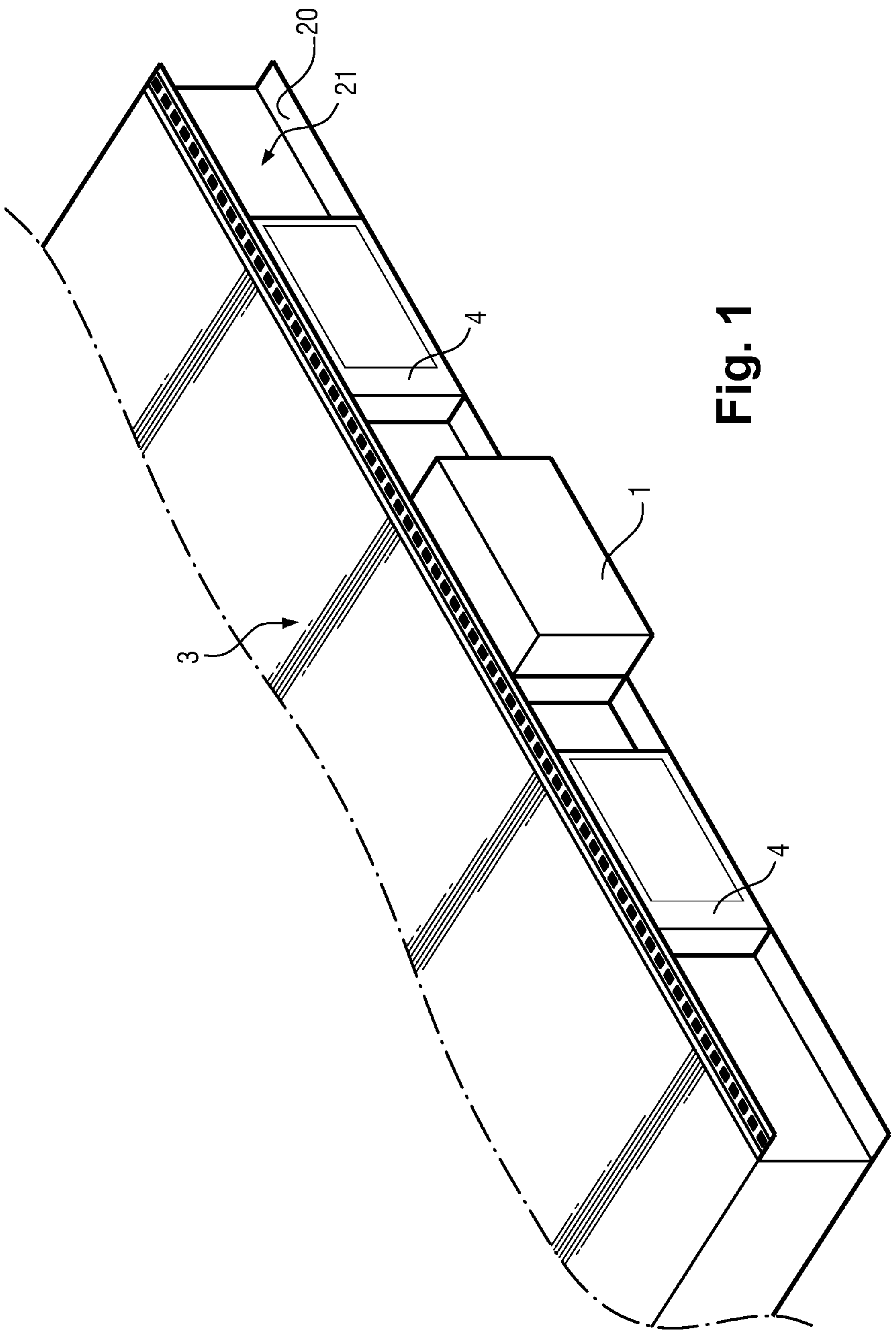
Figure 2:
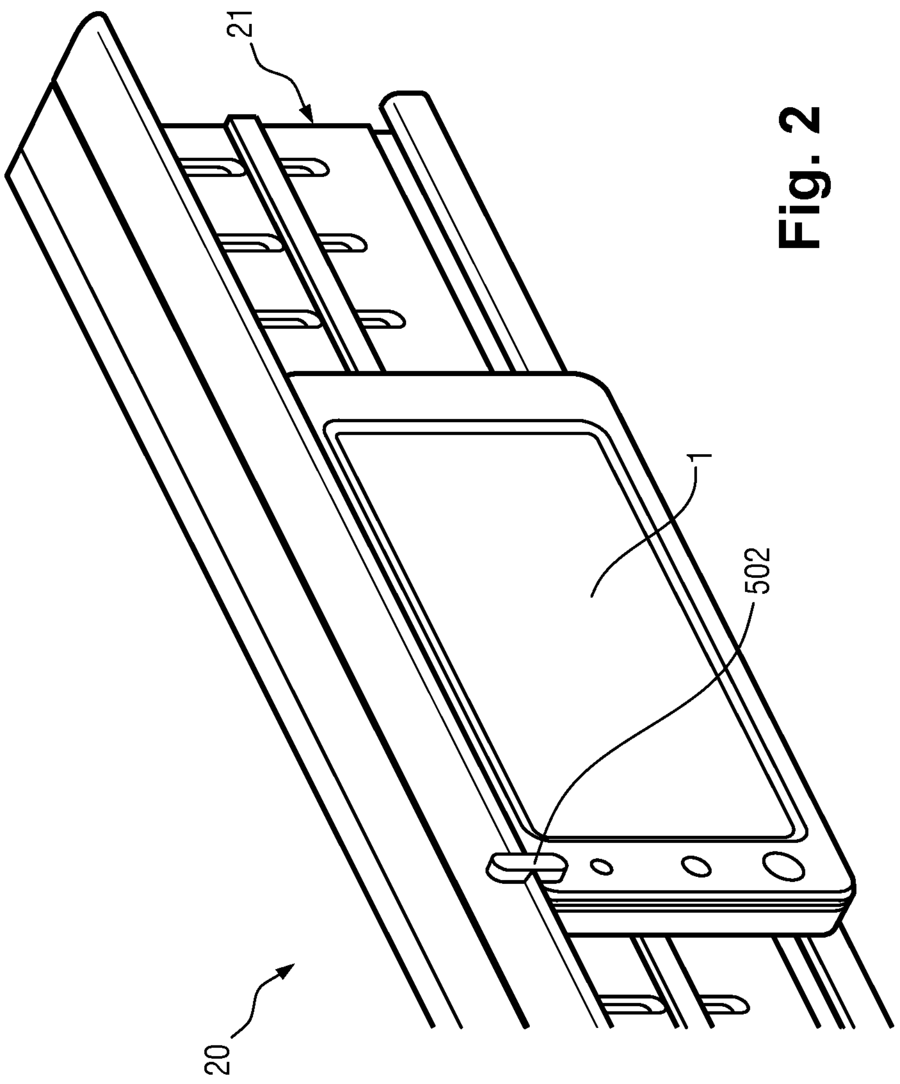

In FIG. 1, only two ESLs 4 are represented; however, according to its length along the shelf 3, shelf support 20 can receive a different number of ESLs 4. It is possible to have up to more than ten ESLs 4 per linear meter of shelf support 20, and hence several thousand, or even tens of thousands of ESLs 4 in one sales area. ESLs 4 can be placed side by side in a continuous series, adjacent to each other, on the shelf support 20.

Also, only one shelf imaging device 1 is shown in FIG. 1. However, each shelf support 20 of the sales area can comprise more than one shelf imaging device 1. The compactness of shelf imaging device 1 described hereinafter allows accommodating a plurality of shelf imaging devices 1, for example, regularly spaced in the shelves 3 of the sales area for each viewing ESLs 4 that would be located in front of the shelf imaging device, typically on the other side of the aisle separating two gondolas.

Shelf support 20 is arranged on a shelf edge of the shelf 3, in a gondola facing a navigation aisle. Preferably, shelf support 20 faces another gondola of the sales area, which comprises other shelves also provided with ESLs 4.

As will be seen below, the shelf imaging device 1 is configured to be removably and reliably fitted in the receiving section 21 of the shelf support 20.

Figure 3:
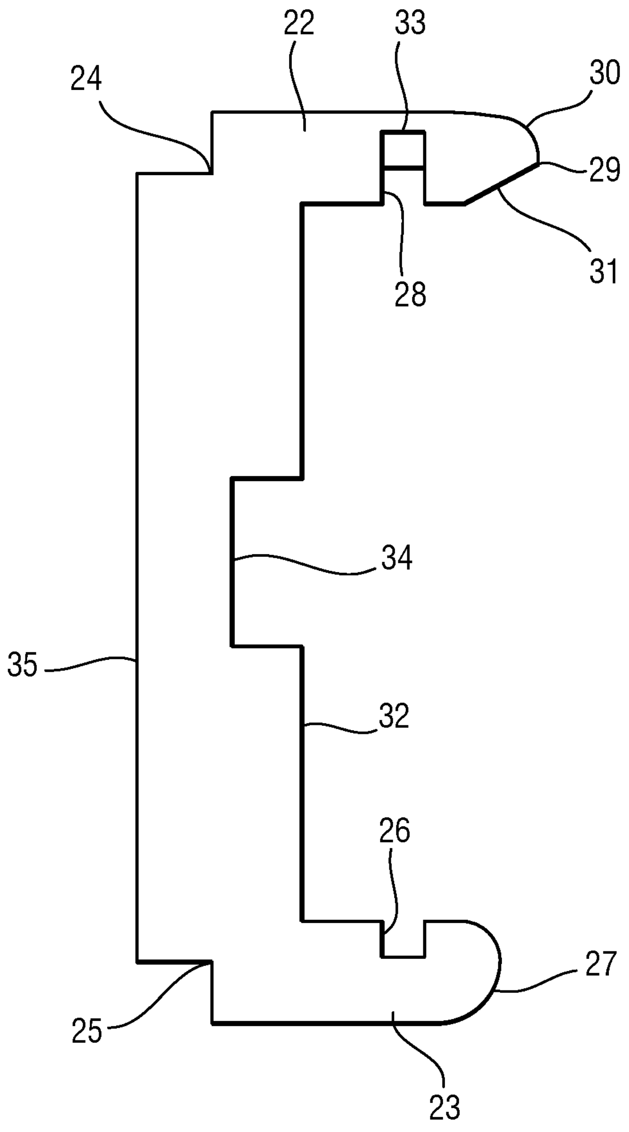
FIG. 3 is a schematic cross-section of the receiving section of a shelf support such as a rail.

FIG. 3 represents a cross-section of the receiving section 21 of the shelf support 20. On this figure, the shelf support is shown as positioned on a shelf, i.e. placed so that its cross-section extends along a vertical direction (which is the direction from top to bottom of FIG. 3). The receiving section 21 has a U-shaped profile with a flat back side 35, an upper wing 22 and a lower wing 23. The back side 35 comprises, on an upper end and lower end, close respectively to the upper wing 22 and the lower wing 23, two notches, respectively 24 and 25.

In its medial region, the lower wing 23 has on its internal profile (facing the upper wing) a longitudinal groove 26. An end 27 of the lower wing 23 is rounded.

The upper wing 22 has on its internal profile (facing the lower wing) and in its medial region, a longitudinal groove 28 in which are provided, at regular intervals, holes 33, for example, blind holes or through holes. These holes are, for example, spaced from each other by about 1 cm.

An end 29 of the upper wing 22 has an external rounded profile 30 and an internal chamfered profile 31.

In its medial region, the receiving section 21 has, preferably has its internal surface 32, a longitudinal trench 34, usable, for example, to fix the receiving section 21 to the shelf 3. This fixation can be realized, for example, via screws.

Figure 4:
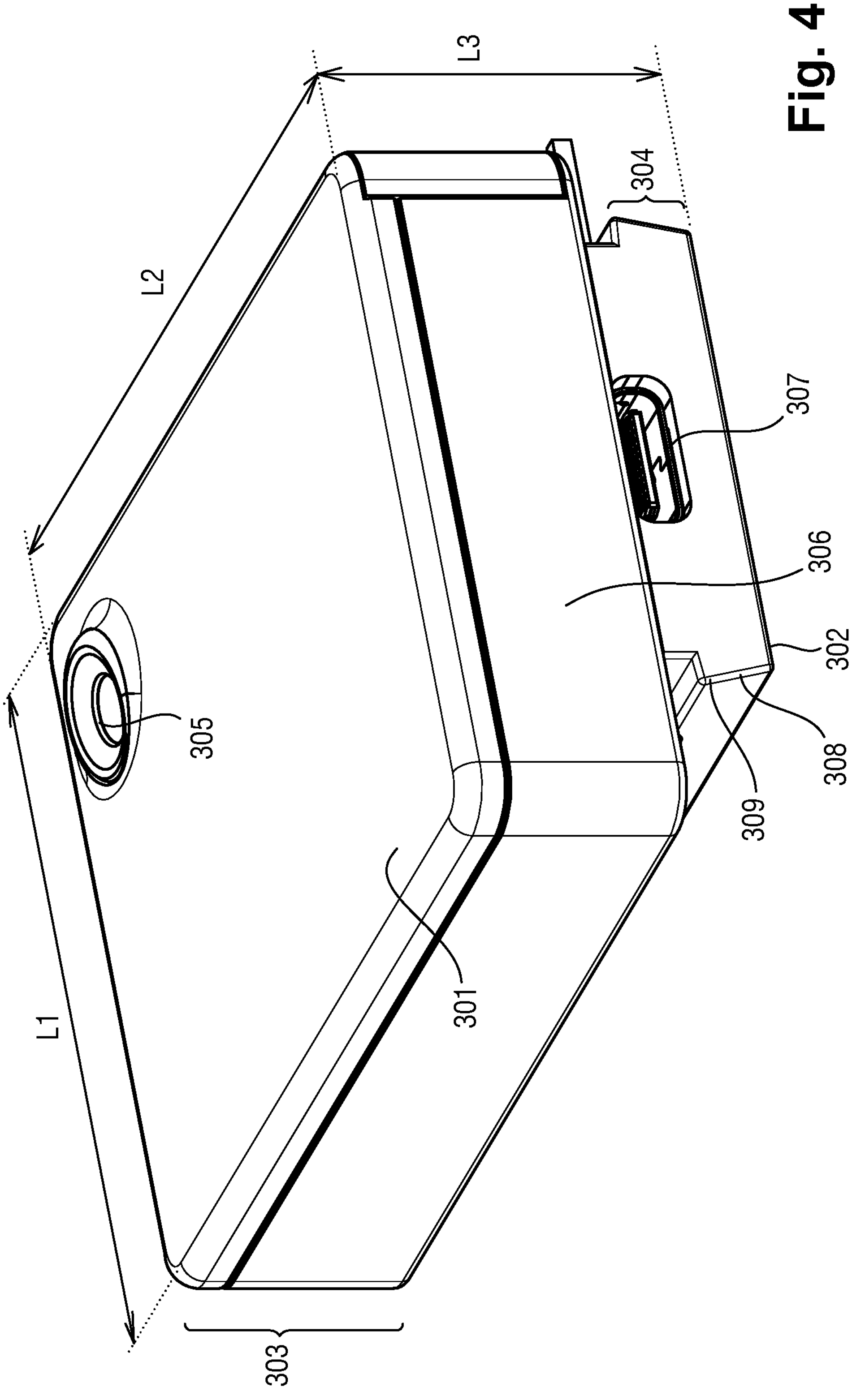
FIG. 4 is a schematic perspective view of a shelf imaging device of the invention.

FIG. 4 represents a shelf imaging device 1 of the invention. The shelf imaging device 1 comprises a front side 301 and a back side 302. The back side 302 is located at the opposite of the front side 301.

The shelf imaging device 1 also has a right lateral side 306 and a left lateral side, not apparent in FIG. 4.

The shelf imaging device 1 comprises a first part 303 extending from the front side 301 and in the direction of the back side 302. This first part 303 has a rectangular parallelepiped form.

The shelf imaging device 1 comprises a second part 304, which extends from the back side 302 and in the direction of the front side 301. The function of this second part 304 is to removably attach the shelf imaging device 1 to the shelf support 20 more precisely to the receiving section 21.

The second part 304 of the shelf imaging device 1 comprises a lower surface 308 with a longitudinal rib 309. This rib 309 is adapted to be inserted in the groove 26 of the lower wing 23 of the receiving section 21.

The shelf imaging device 1 comprises a processing unit, a battery and a memory (not shown) and further comprises an optical sensor 305 and a wired data port 307. The processing unit, the battery, the memory, the optical sensor 305 and the wired data port 307 are typically mounted on a printed circuit board (not shown) of the shelf imaging device 1.

The wired data port 307 is, for example, a USB port. This port allows the connection of the shelf imaging device 1 with another device, for example, a computer.

The optical sensor 305 is configured to acquire images of shelves facing the front side 301 of the shelf imaging device 1. The optical sensor 305 can be a camera.

The shelf imaging device 1 has a height L1 and a width L2 close to a length and a width of usual ESLs (approximately 3 mm). However, a depth L3 of the shelf imaging device 1 is between 1.5 cm and 2.5 cm, preferably 2 cm. Therefore, the depth L3 of the shelf imaging device 1 is bigger than the one of the usual ESLs 4.

Having the height L1 and width L2 of the shelf imaging device 1 close to the ones of the regular ESLs 4, allows shelf imaging device 1 to be almost invisible to a customer of the sales area. Thus, shelf imaging device 1 does not detract from the aesthetical qualities of the shelves. The customer experience is not disturbed by the presence of the shelf imaging device 1.

Furthermore, having the height L1 and width L2 of the shelf imaging device 1 close to the ones of the regular ESLs, also allows the top of the shelf imaging devices 1 to be at almost the same level as the top of the ESLs 4 and to not protrude above the top of the ESLs 4. This avoids forming snap points for objects that are moved relative to and near the top of the ESLs 4 and the top of the shelf imaging devices 1.

Figure 5:
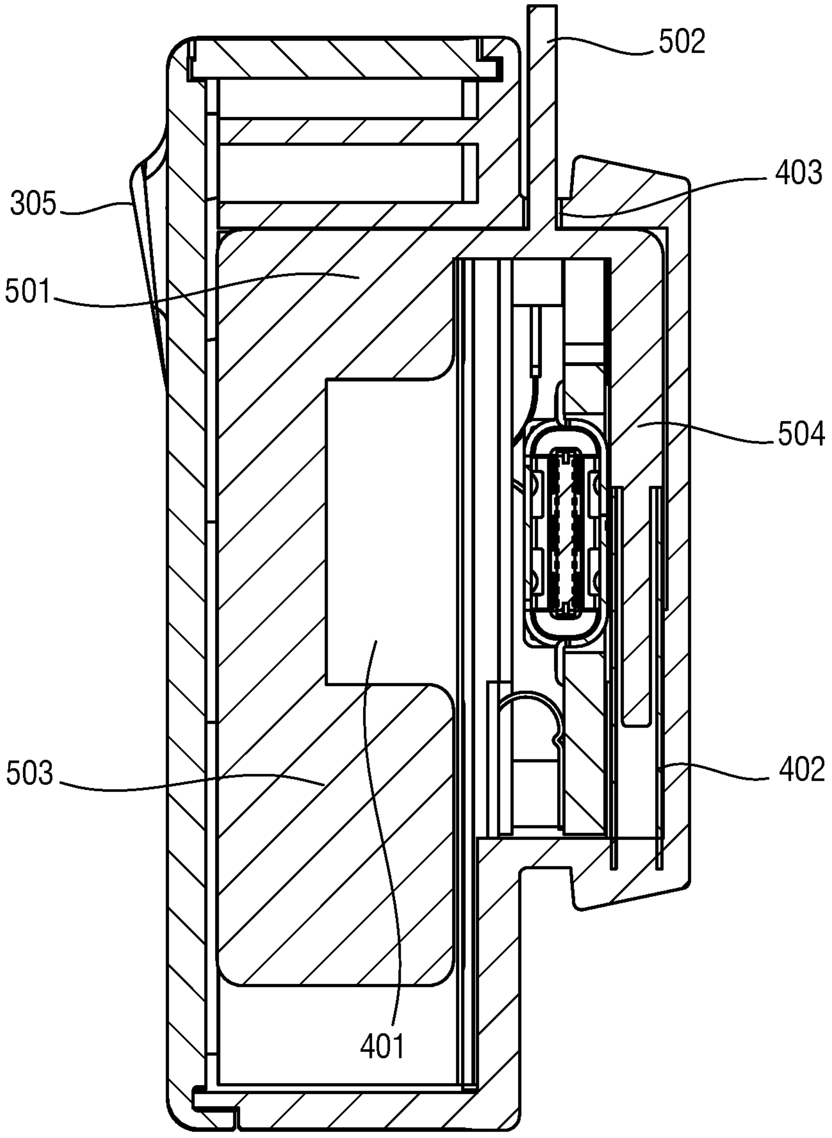
FIG. 5 is a cross-section of the same shelf imaging device of the invention.

In FIG. 5, the shelf imaging device 1 is shown in cross-section in the vertical plane perpendicular to the front side 301 or the back side 302. This cross-section passes through a locking mechanism 501 represented in FIG. 6.

This locking mechanism 501 allows the locking, and unlocking, of the shelf imaging device 1 to, and from, the receiving section 21.

The locking mechanism 501 is generally flat, along a plane that is perpendicular to the front side 301. This plane is also parallel to the right lateral side 306 and is near the right lateral side 306. The expression "near the right lateral side" means that the distance between the plane and the right lateral side 306 is between 1 mm and 2 mm, advantageously 1.5 mm. The locking mechanism 501 is located in a recess 401 of the shelf imaging device 1. This recess 401 extends over at least a portion of the height of the shelf imaging device 1.

In another embodiment, the plane can be parallel to the left lateral side and can be near the left lateral side. The expression "near the left lateral side" means that the distance between the plane and the left lateral side is between 1 mm and 2 mm, advantageously 1.5 mm.

The locking mechanism 501 comprises an engaging member 502 for engaging one of the holes 33 of the receiving section 21, to lock the shelf imaging device 1 into the gondola 3. This engaging member 502 is, for example, a pin.

The engaging member 502 is preferably located between 1 cm and 2 cm, most preferably 1.5 cm from the front side 301 of the shelf imaging device 1.

The locking mechanism 501 also comprises an actuator 503 configured to move the engaging member 502 between a locking position where the shelf imaging device 1 is locked into the receiving section 21 and a free position where the shelf imaging device 1 is free to be displaced relative to the shelf 3.

The actuator 503 comprises a magnetic element that extends between a front end 503-*a*, near the front side 301 of the shelf imaging device 1, and a back end 503-*b* bearing or linked to the engaging member 502.

The front end 503-*a* is the part of the actuator 503 the closest to the front side 301 of the shelf imaging device 1.

The locking mechanism 501 comprises a guiding element 504 acting with a spring 402, for example a spiral spring, to urge upwardly the locking mechanism 501 and more precisely the engaging member 502, to project the engaging member 502 through an opening 403 of the shelf imaging device 1, and to place the engaging member 502 within one of the holes 33 of the receiving section 21.

Figure 6:
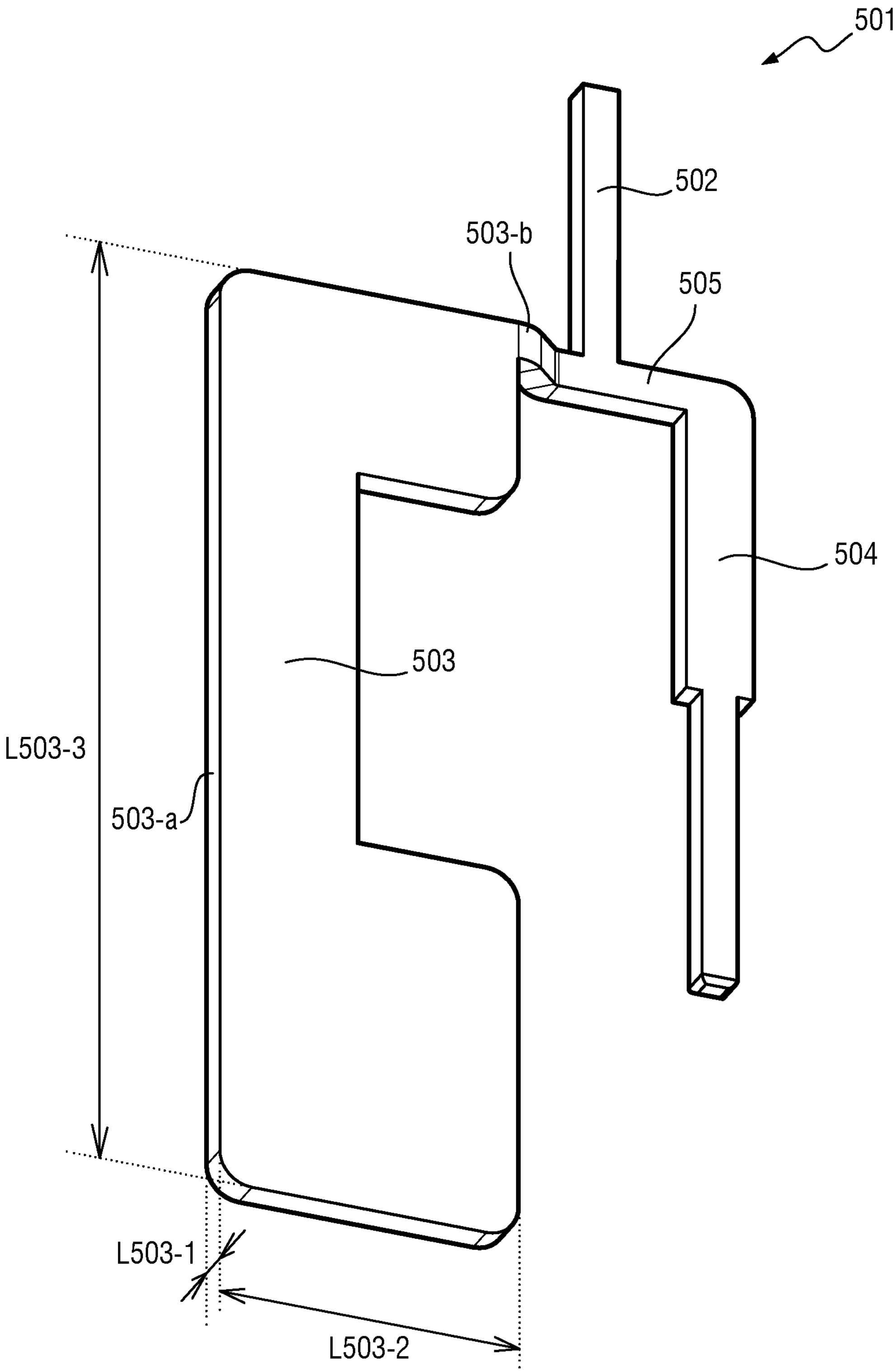
FIG. 6 represents the locking mechanism of a shelf imaging device of the invention.

As represented in FIG. 5 and FIG. 6, the locking mechanism 501 comprises a rigid link 505 linking together the actuator 503, the guiding element 504 and the engaging member 502.

The actuator 503 and the guiding element 504 form two parallel branches of the locking mechanism 501. The actuator 503 is located near the front side 301 of the shelf imaging device 1 and the guiding element 504 is located near the back side 302 of the shelf imaging device 1.

The actuator 503 can be constituted of a flat element for example a magnetic metal plate. The actuator 503 can have a thickness L503-1 comprised between 0.8 and 1.2 mm preferably 1 mm, a width L503-2 comprised between 0.5 cm and 1.5 cm advantageously 0.9 cm and a length L503-3 comprised between 2 cm and 3 cm advantageously 2.5 cm.

This magnetic metal is a standard magnetic metal for example steel or nickel alloy.

As represented in FIGS. 5 and 6, the actuator 503, the guiding element 504, the engaging member 502 and the link 505 can be located in the same plane.

In an embodiment, the actuator 503 have a rectangular shape. In another embodiment, the actuator 503 is hollow or has a C-shape or cutout. This C-shape or cutout allows the passage of connectors (for example USB) through the actuator 503. This C-shape or cutout also allows an easier assembly. With this C-shape or cutout, the actuator 503 can be tilt in a position where the assembly is easier.

The front end 503-*a* of the actuator 503 is located near the front side 301 of the shelf imaging device 1.

Located near the front side 301 means in the present specification that the distance between the front end 503-*a* of the actuator 503 and the front side 301 is between 1 mm and 2 mm, advantageously 1.5 mm.

The front end 503-*a* of the actuator 503 can also be located near one of the lateral sides (near the right lateral side 306 in FIG. 5) of the shelf imaging device 1.

Located near the lateral side means that the distance between the lateral side and the front end 503-*a* is between 1 and 2 mm, advantageously 1.5 mm.

The distance, comprised between 1 and 2 mm, separating the front end 503-*a* of the actuator 503 and the front side 301 and/or lateral side 306 of the shelf imaging device 1, allows the use of extraction tool having a magnet with a residual magnetism of less than 1.4 Tesla and advantageously comprised between 1.29 Tesla and 1.32 Tesla. More precisely, a residual magnetism of 1.4 Tesla applied in the vicinity, for example at less than 1.5 mm, of the front side 301 of the shelf imaging device 1 is enough to move the actuator 503 downside and retract the engaging member 502 in the shelf imaging device 1.

Therefore, the extraction tool usable with the locking mechanism 501 of the invention will not generate drawbacks, such as disruptions on the shelf imaging devices 1 or undesired activation of medical devices, such as pacemakers, worn by the user.

Furthermore, the locking mechanism 501 of the invention can be used with the extraction tool used to unlock the ESL and described in the French patent reference FR2765019B1. In particular the locking mechanism 501 of the invention can be used with an extraction tool having a magnet with a residual magnetism of less than 1.4 Tesla and advantageously comprised between 1.29 Tesla and 1.32 Tesla.

In an embodiment, the engaging member 502 (for example the pin), the actuator 503 and the guiding element 504 form a single piece.

In an embodiment, the engaging member 502 (for example the pin), the actuator 503 and the guiding element 504 are realized as separated elements and attached together, by example by welding.

In an embodiment, the engaging member 502 (for example the pin), the guiding element 504 and the link 505 form a single piece that is attached with the actuator 503, for example by welding.

To mount the shelf imaging device 1 in the receiving section 21, the rib 309 is first inserted in the groove 26 of the receiving section 21. The rib 309 serving as a pivotal axis, the upper portion of the shelf imaging device 1 is pressed toward the bottom of the receiving section 21.

The engaging member 502 is applied to the inner chamfered profile 29 which presses it inwardly of the shelf imaging device 1 by compressing the spring 402.

When the shelf imaging device 1 is near its normal operating position, the engaging member 502 penetrates, under the action of the spring 402, the groove 28 of the upper wing 22 of the support 20. The shelf imaging device 1 is thus in the operative position.

The shelf imaging device 1 is then moved along the shelf support 20, by sliding, until the engaging member 502 penetrates, under the action of the spring 28, one of the holes 33. The shelf imaging device 1 is then in the locked position.

To remove the shelf imaging device 1, the extraction tool will be used. This extraction tool is used by approaching the extraction tool to the shelf imaging device 1 by its front side 301.

The extraction tool comprises a housing for example of plastic material and a magnetic circuit constituted a magnet and a ferromagnetic core.

When placed close to the front side 301 of the shelf imaging device 1, the magnet and the ferromagnetic core face the front end 503-*a* of the actuator 503 and, more precisely a bottom part of the front end 503-*a*. The actuator 503 is thus attracted downwardly and moves to compress the spring 402, such that the engaging member 502, which follows the displacement of the actuator 503, leaves the blind hole 33 and the groove 28 of the receiving section 21, thereby freeing the shelf imaging device 1. The shelf imaging device 1 is then manually separated from the extraction tool, and the actuator 503 is then returned by the spring 402 to the initial position. The engaging member 502 resumes its initial position projecting from outside the envelope of the shelf imaging device 1.

The invention claimed is:

1. A shelf imaging device for a shelf support, wherein the shelf support is installed on a shelf edge and comprises a receiving section configured to receive electronic shelf labels, the receiving section comprising two facing wings extending in a longitudinal direction, one of the two wings has in its medial region a longitudinal groove, the groove has a plurality of holes, wherein the shelf imaging device comprises:

a back side configured to be removably fitted in the receiving section, a front side opposite to the back side, an optical sensor configured to acquire an image of shelves facing the front side, an engaging member for engaging the receiving section so as to lock the shelf imaging device into the shelf support, when the engaging member protrudes from the shelf imaging device and engages one of the holes, at or behind the back side of the shelf imaging device, a guiding element and a spring, the guiding element and the spring being configured together to urge upwardly the engaging member to project through an opening of the shelf imaging device, an actuator configured to move the engaging member between a locking position where the shelf imaging device is locked into the shelf support and a free position where the shelf imaging device is free to be displaced relative to the shelf support, the actuator comprising a magnetic element which extends between a front end located near the front side or near a lateral side of the shelf imaging device, and a back end linked to the engaging member, and a link linking together the guiding element, the engaging member and the actuator.

2. The shelf imaging device according to claim 1, wherein the magnetic element of the actuator is a metal plate extending along a plane perpendicular to the front side, parallel to the lateral side and near the lateral side, a length of the metal plate is comprised between 2 cm and 3 cm or a width of the metal plate is comprised between 0.5 cm and 1.5 cm or a thickness of the metal plate is comprised between 0.8 mm and 1.2 mm.

3. The shelf imaging device, according to the claim 1, wherein the front end is located between 1 mm and 2 mm from the front side.

4. The shelf imaging device according to claim 1, wherein the front end is located between 1 mm and 2 mm from a lateral side of the shelf imaging device.

5. The shelf imaging device according to claim 1, wherein a distance between the engaging member and the front side of the shelf imaging device is comprised between 1 cm and 2 cm.

6. The shelf imaging device according to claim 1, wherein the guiding element, the engaging member and the actuator form a single piece.

7. A shelf system comprising a shelf comprising:

a shelf support configured to extend along an edge of the shelf, the shelf support comprising a receiving section configured to receive electronic labels; and an imaging device according to claim 1, the back side of the imaging device being configured to be removably fitted in the receiving section of the shelf support.

* * * * *